United States Patent [19]
Feher

[11] 3,944,926
[45] Mar. 16, 1976

[54] TIMING TECHNIQUE FOR NRZ DATA SIGNALS

[75] Inventor: Kamilo Feher, Brossard, Canada

[73] Assignee: RCA Corporation, New York, N.Y.

[22] Filed: Dec. 6, 1974

[21] Appl. No.: 530,402

[30] Foreign Application Priority Data
Sept. 30, 1974 Canada .................................. 210327

[52] U.S. Cl. ............................... 325/38 R; 325/141
[51] Int. Cl.² ............................................... H04B 1/00
[58] Field of Search ........ 325/141, 38 R, 38 B, 322, 325/323; 332/9 R, 9 T, 11 R; 329/104; 307/263

[56] References Cited
UNITED STATES PATENTS

| | | | |
|---|---|---|---|
| 2,515,452 | 7/1950 | Kaufman | 325/38 R |
| 3,638,124 | 1/1972 | Lindquist | 325/38 R |
| 3,803,502 | 4/1974 | Pillot | 325/38 R |

*Primary Examiner*—Albert J. Mayer
*Attorney, Agent, or Firm*—Carl M. Wright; Edward J. Norton

[57] ABSTRACT

Circuit for modifying a transmitted Non-Return-to-Zero signal to insert a frequency component at the bit rate to permit linear processing at the receiver to extract timing signals.

1 Claim, 3 Drawing Figures

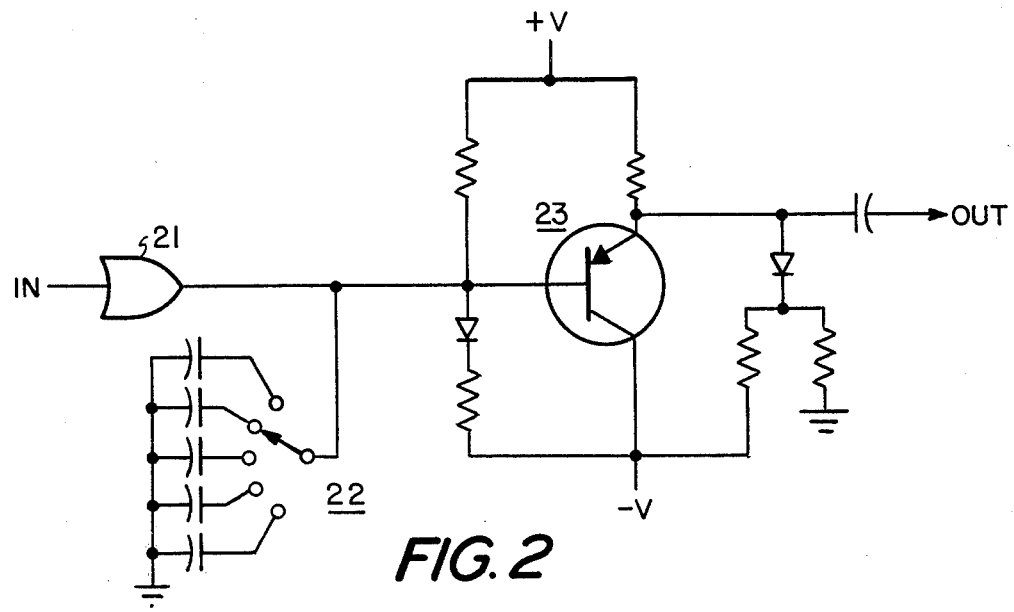
FIG. 1
FIG. 2
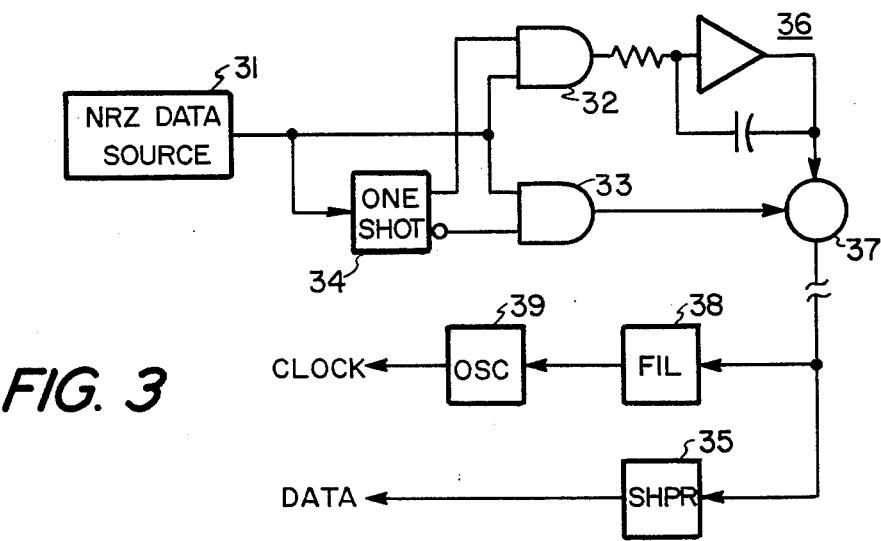
FIG. 3

TIMING TECHNIQUE FOR NRZ DATA SIGNALS

BACKGROUND OF THE INVENTION

1. Field of the Invention:

This invention pertains to digital transmission of information.

2. Description of the Prior Art:

Non-Return-to-Zero (NRZ) data signals have the advantage of narrower bandwidths than some other types of transmission signals. A disadvantage of NRZ for data transmission is the absence of a frequency component at the bit rate. NRZ signals usually require a clock signal to accompany the data signals in order to interpret data correctly.

Other techniques for bit timing in NRZ add discrete frequency components at the bit rate or vary the duration of the information bits. Adding a sinusoid to the transmitted signal reduces the signal to noise ratio. If the timing sinusoid is added outside the band or the pulse duration of the information bits is varied, then a wider bandwidth is required than with the NRZ signals alone.

The invention herein described and claimed discloses a circuit and method for inserting a frequency component at the bit rate which does not increase the bandwidth requirement of NRZ and which causes no signal-to-noise degradation, but which can be linearly extracted at the receiver.

SUMMARY OF THE INVENTION

Apparatus and method for processing Non-Return-to-Zero binary information signals so that the rise times of each individual signal is different from its fall time.

BRIEF DESCRIPTION OF THE DRAWINGS

FIG. 1 is a timing chart illustrating various waveshapes for an arbitrary bit stream.

FIG. 2 is a block diagram of one embodiment of the invention showing a transmitting circuit.

FIG. 3 is a schematic of an alternative embodiment of a transmitting and a receiving circuit.

DESCRIPTION OF THE PREFERRED EMBODIMENTS

In the following description, the information signals are understood to be of a random nature. Signals carry the maximum amount of information when they are random, any nonrandomness being predictable and therefore known or knowable by the recipient.

FIG. 1(a) illustrates an example of a bit stream of information; FIG. 1(b), a corresponding Return-to-Zero (RZ) signal; FIG. 1(c), a corresponding NRZ signal; and FIG. 1(d), a modified NRZ signal in accordance with the invention. A Fourier analysis of random signals will indicate that the RZ signals such as shown in FIG. 1(b) will contain all of the odd harmonics of the fundamental frequency. The fundamental frequency of the RZ signal is the bit rate. A filter at the receiving end can be used to extract the fundamental frequency and phaselock a timing oscillator. If the speed of data transmission is constant and an accurate oscillator is used at the receiving end, the RZ signals, which are not self-clocking, can be received without the addition of a timing channel. The phase lock of the oscillator will permit slight jitter, i.e., pertubations about the actual bit rate, to be tolerated. A long string of zeros, however, can cause the oscillator to fall out of synchronization with the data.

The analysis of a random NRZ signal will show that there is no frequency component at the bit rate. A phaselock signal can be extracted from the NRZ signals but nonlinear processing of the signal is required. (See, for example, W. R. Bennett, "Statistics of Regenerative Digital Transmission" *Bell System Technical Journal*, Nov., 1958, pp. 1501-1542). It is difficult to optimize the design of a non-linear system but a linear design can be optimized. This, inter alia, makes it desirable to extract a phase-lock signal linearly at the receiver.

The signal shown in FIG. 1 (d) is an example of an NRZ signal according to the invention. Non-linear processing of the data is performed at the transmitter which changes the rise or fall times unequally. The bandwidth of the signal is compatible with that of NRZ but the signal has a discrete spectrum component at the bit rate. The invention is also applicable to multi-level data transmission.

Non-linear signal processing at the transmitter also simplifies the filtering of digital data which is a problem in data transmission. The non-linear processing of the transmitted information causes a decrease in the power spectrum density at high frequencies so that band limited transmission eases the requirements for channel filtering.

There is, however, some loss of signal energy per transmitted bit. Depending on the bandwidth and worst-case noise conditions (noise density), the signal-to-noise ratio can be determined and, consequently, the amount of non-linear processing can be optimized.

One embodiment of a circuit for producing the desired modified NRZ waveshape is shown in FIG. 2. The NRZ information signals are applied as the input signal to a logic gate such as the OR gate 21 which operates as a buffer. The signal from gate 21 has an output impedance which varies with the signal. That is, the output impedance of the gate 21 is different for a high output signal from that for a low output signal. The output signal is coupled to a switch 22 for selecting a shunt capacitance of a desired value. The output signal from the gate 21 is also applied to another buffer circuit 23 containing a emitter follower transistor.

The purpose of the output buffer is to present a constant impedance to the output line and a high input impedance from the gate 21. The input impedance to the buffer 23 is made much higher than the high output impedance of the gate 21. The resistive impedance at the switch 22 is therefore a function of the output impedance of the gate 21.

The difference in output impedances of the gate 21 with different signals causes the rise time of the output signal from the gate to be different from that of the fall time. The rise and fall times are proportional to the product of the output impedance of the gate 21 and the selected capacitance. Therefore, the modified NRZ output signal from the buffer 23 will have unequal rise and fall times.

FIG. 3 illustrates another embodiment of the invention for producing a waveshape such as that illustrated in FIG. 1(d). The NRZ data source 31 supplies an information signal to a pair of AND gates 32 and 33. The other input signals to the AND gates 32 and 33 are the output signal and its complement from a one-shot multivibrator 34, which is triggered by the positive-going edge of the NRZ signal from the data source 31. The output signal from the AND gate 32 is applied to the input node of an integrator 36. The output signal from the integrator 36 and the output signal from the AND gate 33 are coupled to a linear adder 37. The linear adder 37 can be a pair of resistors or any other well known circuit. The output signal from the linear adder 37 is transmitted over the transmission line to the receiver which includes a filter 38, a shaper 35, and a clock oscillator 39. The output signal from the filter 38 is used to phase lock the clock oscillator 39.

The period of the one-shot 34 is determined by the desired slope of the rise time of the output signal. It is less than a bit period. The operation of the circuit in FIG. 3 is described below.

When the output signal from the NRZ data source 31 goes high, the one-shot 34 is activated which in turn enables the AND gate 32 and disables the AND gate 33. The output signal from the AND gate 32 is integrated by the integrator 36 to form a substantially straight slope and is transmitted to the receiver via the linear adder 37. At the end of the one-shot period, the AND gate 32 is disabled and the AND gate 33 is enabled producing the output signal over the transmission line via the linear adder 37.

At the receiving end, the filter 38, which is centered at the bit rate frequency, extracts the signal at the bit rate frequency and locks the clock oscillator 39 into phase. The shaper 35 can be a threshold device to restore the rising and falling edges of the NRZ signal for processing by the rest of the receiving apparatus (not shown).

The embodiments shown and described indicate how a bit rate frequency component can be added into an NRZ signal without increasing the bandwidth.

Various modifications to the systems and circuits described and illustrated to explain the concepts and modes of practicing the invention might be made by those of ordinary skill in the art within the principle or scope of the invention as expressed in the appended claims.

What is claimed is:

1. The combination comprising:
   means for generating non-return-to-zero binary information signals;
   means for modifying said signals to have rise times differing from fall times including
   signal output means,
   signal integrating means for producing an integrated signal to said signal output means,
   timing means responsive to said binary information signals for producing a timing signal having a duration less than each bit of said binary information signals, and
   gating means responsive to said timing signal for applying said binary information signals to said signal integrating means during the timing signal duration and otherwise to said signal output means; and
   means for transmitting said signals from said signal output means to a receiving means.

* * * * *

UNITED STATES PATENT AND TRADEMARK OFFICE
CERTIFICATE OF CORRECTION

PATENT NO. : 3,944,926

DATED : March 16, 1976

INVENTOR(S) : Kamilo Feher

It is certified that error appears in the above-identified patent and that said Letters Patent is hereby corrected as shown below:

Title Page, change "[73] Assignee: RCA Corporation, New York, N.Y." to --[73] Assignee: RCA Limited, Quebec, Canada--

Signed and Sealed this

Twenty-seventh Day of November 1979

[SEAL]

Attest:

RUTH C. MASON
*Attesting Officer*

LUTRELLE F. PARKER
*Acting Commissioner of Patents and Trademarks*